US008648295B2

(12) United States Patent
Enke et al.

(10) Patent No.: US 8,648,295 B2
(45) Date of Patent: Feb. 11, 2014

(54) COMBINED DISTANCE-OF-FLIGHT AND TIME-OF-FLIGHT MASS SPECTROMETER

(76) Inventors: Christie G. Enke, Placitas, NM (US); Steven J. Ray, Bloomington, IN (US); Alexander W. Graham, Bloomington, IN (US); Gary M. Hieftje, Bloomington, IN (US); Charles J. Barinaga, West Richland, WA (US); David W. Koppenaal, Richland, WA (US)

( * ) Notice: Subject to any disclaimer, the term of this patent is extended or adjusted under 35 U.S.C. 154(b) by 0 days.

(21) Appl. No.: 13/695,675

(22) PCT Filed: May 3, 2011

(86) PCT No.: PCT/US2011/034933
§ 371 (c)(1),
(2), (4) Date: Nov. 1, 2012

(87) PCT Pub. No.: WO2011/140040
PCT Pub. Date: Nov. 10, 2011

(65) Prior Publication Data
US 2013/0092832 A1 Apr. 18, 2013

Related U.S. Application Data

(60) Provisional application No. 61/330,996, filed on May 4, 2010.

(51) Int. Cl.
*H01J 49/40* (2006.01)
*H01J 49/34* (2006.01)

(52) U.S. Cl.
USPC ......................................... 250/287; 250/282

(58) Field of Classification Search
USPC .................. 250/281, 282, 286, 287
See application file for complete search history.

(56) References Cited

U.S. PATENT DOCUMENTS

| | | | |
|---|---|---|---|
| 4,855,594 A | 8/1989 | Kimock et al. | |
| 6,590,206 B1 | 7/2003 | Evrard | |
| 6,674,069 B1 | 1/2004 | Martin et al. | |
| 6,933,497 B2* | 8/2005 | Vestal | 250/287 |
| 6,949,738 B2 | 9/2005 | Yamaguchi et al. | |
| 7,041,968 B2 | 5/2006 | Enke | |
| 7,429,728 B2 | 9/2008 | Enke | |
| 7,498,585 B2 | 3/2009 | Denton et al. | |
| 7,947,950 B2 | 5/2011 | Enke et al. | |
| 2005/0040326 A1* | 2/2005 | Enke | 250/288 |
| 2006/0138318 A1* | 6/2006 | Enke | 250/287 |
| 2008/0017792 A1 | 1/2008 | Enke et al. | |
| 2008/0087814 A1* | 4/2008 | Loucks | 250/287 |
| 2011/0215239 A1* | 9/2011 | Yamaguchi | 250/287 |

OTHER PUBLICATIONS

PCT International Search Report and Written Opinion completed by the U.S. Searching Authority on Aug. 12, 2011 and issued in connection with PCT/US2011/034933.

(Continued)

*Primary Examiner* — Robert Kim
*Assistant Examiner* — David E Smith
(74) *Attorney, Agent, or Firm* — Barnes & Thornburg LLP

(57) ABSTRACT

A combined distance-of-flight mass spectrometry (DOFMS) and time-of-flight mass spectrometry (TOFMS) instrument includes an ion source configured to produce ions having varying mass-to-charge ratios, a first detector configured to determine when each of the ions travels a predetermined distance, a second detector configured to determine how far each of the ions travels in a predetermined time, and a detector extraction region operable to direct portions of the ions either to the first detector or to the second detector.

30 Claims, 4 Drawing Sheets

(56) References Cited

OTHER PUBLICATIONS

PCT International Search Report and Written Opinion completed by the U.S. Searching Authority on Jul. 13, 2012 and issued in connection with PCT/US2011/033761.

C.G. Enke et al., "Achievement of Energy Focus for Distance-of-Flight Mass Spectrometry with Constant Momentum Acceleration and an Ion Mirror," 79 Analytical Chemistry 8650-8661 (2007).

* cited by examiner

COMBINED DISTANCE-OF-FLIGHT AND TIME-OF-FLIGHT MASS SPECTROMETER

STATEMENT REGARDING FEDERALLY SPONSORED RESEARCH OR DEVELOPMENT

This invention was made with government support under Grant Nos. DE-AC05-76RL01830 and DE-FG02-98ER14890 awarded by the Department of Energy. The U.S. Government has certain rights in the invention.

CROSS-REFERENCE TO RELATED APPLICATIONS

This application is a U.S. national counterpart application of International Application Serial No. PCT/US2011/034933, filed May 3, 2011, which claims the benefit of U.S. Provisional Patent Application No. 61/330,996, filed May 4, 2010, the entire disclosures of which are hereby incorporated by reference.

TECHNICAL FIELD

The present disclosure relates generally to mass spectrometry (MS) instruments and, more specifically, to MS instruments operable to separate ions both in distance and in time as a function of ion mass-to-charge ratios.

BACKGROUND ART

Distance-of-flight mass spectrometry (DOFMS) may be explained in comparison to the more conventional technique of time-of-flight mass spectrometry (TOFMS). TOFMS is a known analytical technique commonly employed in a wide range of fields, such as chemistry, biology, medicine, environmental studies, and physics, as well as in a wide range of associated applications. TOFMS measures the time required for ions of varying mass-to-charge ratios (m/z, where m=mass, z=charge) to traverse a known distance. While a number of TOFMS geometries exist, a generic scheme describes the general approach. First, subject ions of various m/z are extracted from an extraction region at substantially the same instant by application of a single, constant electrostatic field. Because all subject ions starting from the same depth in the extraction region are exposed to the same electrostatic field, they gain the same kinetic energy (KE) and, thus, achieve differing velocities (v) dependent on their mass (according to $KE=(\frac{1}{2})mv^2$). The subject ions are then allowed to traverse a field-free flight region, wherein the ions separate according to their m/z-dependent velocities. Finally, a mass spectrum is acquired by capturing the time-dependent readout of a suitable detector placed at the exit of the field-free region. Ions of smaller m/z achieve relatively higher velocities and thus reach the detector first, while ions of larger m/z achieve relatively lower velocities and thus require a longer time to reach the detector. The time required by ion to traverse the field-free region is quadratically related to the m/z of the ion.

In contrast to the TOFMS strategy (which measures the time an ion requires to traverse a specified distance), DOFMS separates ions of various m/z ratios according to the distance each ion is able to travel during a specified time period. After velocity separation, the spatial distribution of the subject ions is measured with a detector that possesses spatial resolution. Various embodiments of instruments employing DOFMS are described in U.S. Pat. Nos. 7,041,968 and 7,429,728 and U.S. Patent Publication No. 2008/0017792, the entire disclosures of which are each expressly incorporated by reference herein. Further background considerations regarding DOFMS are described in C. G. Enke et al., "Achievement of Energy Focus for Distance-of-Flight Mass Spectrometry with Constant Momentum Acceleration and an Ion Mirror," 79 Analytical Chemistry 8650-8661 (2007), the entire disclosure of which is also expressly incorporated by reference herein.

As described in the foregoing references, the subject ions in DOFMS may be accelerated to a constant momentum (rather than a constant energy, as in typical TOFMS) prior to m/z separation in a field-free region, to better focus the ions in space at a specific time. Constant momentum acceleration (CMA) may be achieved by focusing ions of various m/z ratios into a region in which a linear electrostatic field of limited duration is applied (i.e., an "extraction pulse"). The duration of the extraction pulse is purposely restricted so that none of the ions of interest are able to exit the region before the pulse ends. This strategy imparts the same momentum (the product of mass and velocity) to each m/z ratio. Thus, the ion velocities will be inversely related to their m/z ratios. Following CMA, ions separate within the field-free region according to their m/z-dependent velocities. At a specific time, delayed from the application of the extraction pulse, ions will be distributed in space according to 1/(m/z). At that time, a second extraction field is employed to deflect all the ions at an angle, onto the surface of a position-sensitive detector, where the spatial distribution reflects the m/z composition of the subject ions.

DISCLOSURE OF INVENTION

The present application discloses one or more of the features recited in the appended claims and/or the following features which, alone or in any combination, may comprise patentable subject matter.

According to one aspect, a mass spectrometry (MS) instrument includes an ion source configured to produce ions having varying mass-to-charge ratios, a first detector configured to determine when each of the ions travels a predetermined distance, a second detector configured to determine how far each of the ions travels in a predetermined time, and a detector extraction region operable to direct portions of the ions either to the first detector or to the second detector.

In some embodiments, the detector extraction region may be operable to direct a first portion of the ions to the first detector and to direct a second portion of the ions to the second detector. The detector extraction region may direct ions toward the second detector when activated and may direct ions toward the first detector when deactivated. In other embodiments, the detector extraction region may direct ions toward the first detector when activated and may direct ions toward the second detector when deactivated. The detector extraction region may include an electrostatic field when activated. In some embodiments, the ions may have a first direction of travel when entering the detector extraction region and the electrostatic field may deflect the ions in a second direction, the second direction being nonparallel to the first direction. The detector extraction region may include a repeller plate which generates the electrostatic field when supplied with a voltage.

In other embodiments, the mass spectrometry instrument may further include a source extraction region which applies an acceleration pulse to the ions produced by the ion source. The acceleration pulse may impart mass-to-charge ratio dependent velocities on the ions. In some embodiments, the acceleration pulse may have a longer period than the time it takes for all of the ions to exit the source extraction region. In other embodiments, the acceleration pulse may have a shorter period than the time it takes for any of the ions to exit the source extraction region. In such embodiments, the mass spectrometry instrument may further include a reflectron configured to provide energy focus to a portion of the ions with a range of initial energies.

According to another aspect, a method includes generating an ion beam having ions of varying mass-to-charge ratios, transmitting the ion beam into a detector extraction region, and directing portions of the ion beam toward one of a first detector configured to determine when each of the ions travels a predetermined distance and a second detector configured to determine how far each of the ions travels in a predetermined time.

In some embodiments, directing portions of the ion beam toward one of the first and second detectors may include (i) directing a first portion of the ion beam to the first detector and (ii) directing a second portion of the ion beam to the second detector. Directing portions of the ion beam toward one of the first and second detectors may also include activating and deactivating the detector extraction region. Activating and deactivating the detector extraction region may include selectively generating an electrostatic field. In some embodiments, directing portions of the ion beam toward the first detector may include allowing portions of the ion beam to pass through the detector extraction region without disturbing a prior trajectory of the ion beam. Directing portions of the ion beam toward the second detector may include deflecting portions of the ion beam from the prior trajectory. In other embodiments, directing portions of the ion beam toward the second detector may include allowing portions of the ion beam to pass through the detector extraction region without disturbing a prior trajectory of the ion beam. Directing portions of the ion beam toward the first detector may include deflecting portions of the ion beam from the prior trajectory.

In other embodiments, the method may further include applying an acceleration pulse to the ion beam to impart mass-to-charge ratio-dependent velocities on the ions. The method may also include transmitting the ion beam through a reflectron configured to provide energy focus to a portion of the ions with a range of initial energies. The method may further include (i) receiving data from the first detector regarding the mass-to-charge ratios of the ions and (ii) determining which portions of the ion beam to direct toward the second detector in response to the data.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF DRAWINGS

The detailed description particularly refers to the accompanying figures in which.

BEST MODE(S) FOR CARRYING OUT THE INVENTION

Figure 1:
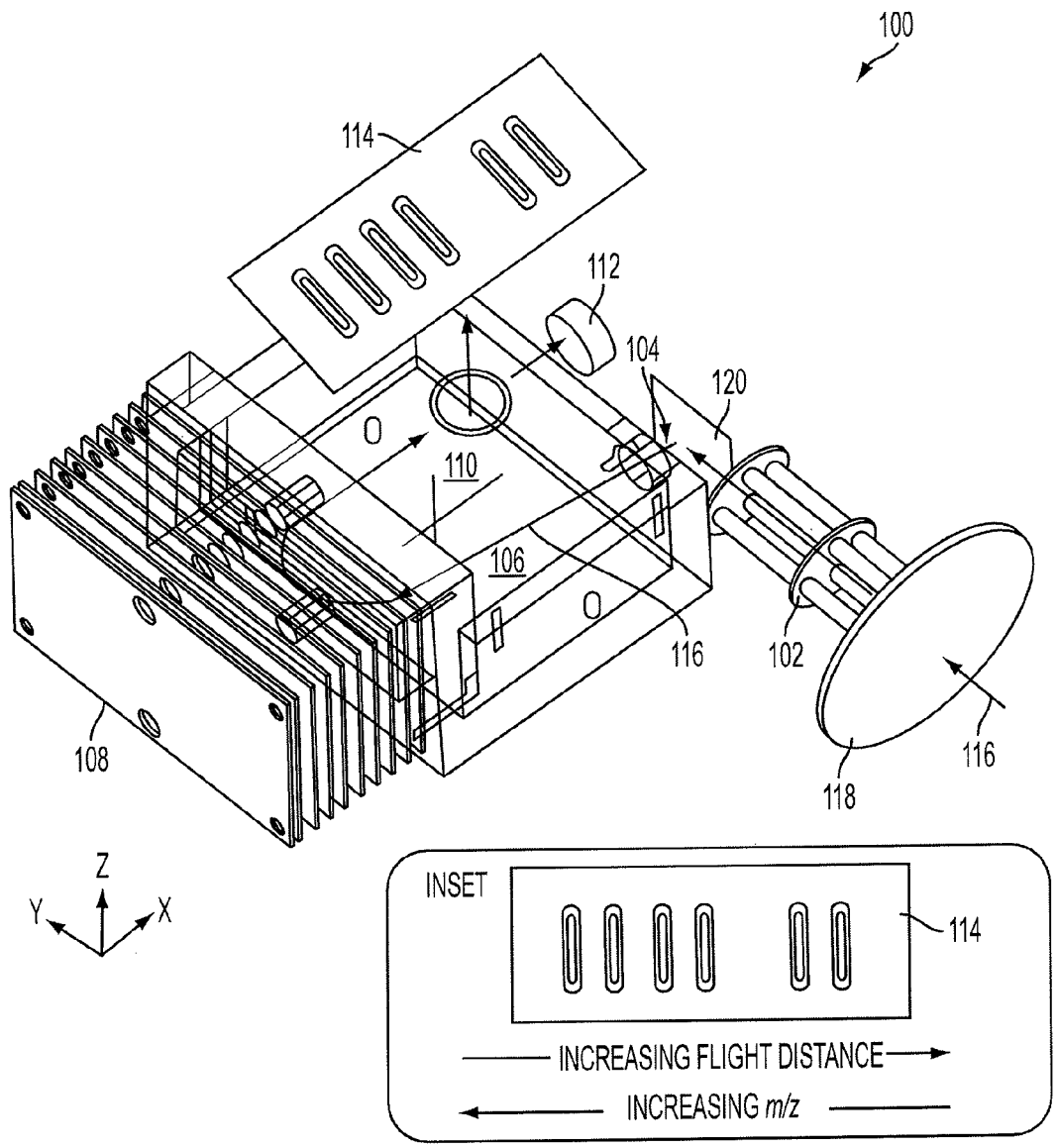
FIG. 1 is a simplified schematic of an illustrative embodiment of a combined DOFMS/TOFMS instrument.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but, on the contrary, the intention is to cover all modifications, equivalents, and alternatives falling within the spirit and scope of the invention as defined by the appended claims.

Referring to FIG. 1, a simplified schematic is presented of one illustrative embodiment of a combined DOFMS/TOFMS instrument 100. In the illustrative embodiment, the instrument 100 generally includes an ion source (not shown), ion optics 102, a first orthogonal extraction region 104, a field-free region 106, a reflectron 108, a second orthogonal extraction region 110, a TOFMS detector 112, and a DOFMS detector 114. It will be appreciated by those of skill in the art that several components of the instrument 100 are not shown in FIG. 1 for clarity. For instance, the ion source and several stages of the ion source interface are not illustrated so as not to obscure other features of the instrument 100. Likewise, the control circuitry of the instrument 100, which is configured to operate the electrical components of the instrument 100 (e.g., ion optics 102 and orthogonal extraction regions 104, 110) and to receive and process signals from the detectors 112, 114, is not illustrated in the figure.

The ion source interface of the instrument 100 is designed such that various external ionization sources may be employed. It is contemplated that any ion source that is configured to controllably produce ions from one or more samples may be used with instrument 100, including, but not limited to, a glow discharge source, an electrospray ionizer (ESI), a matrix-assisted laser desorption ionizer (MALDI), a thermal ionizer, an electron-impact ion source, a corona discharge source, an inductively coupled plasma source, a spark/arc source, a liquid or gas chromatograph, the output of another mass-analyzer instrument, or the like. In the illustrative embodiment, the ion source interface consists of three differentially pumped vacuum stages. The first vacuum stage samples ions from the ion source and is typically maintained at a pressure of around one Torr. The second vacuum stage is isolated from the first stage with a skimmer cone and is maintained at a pressure of around 0.1 mTorr. Following another skimmer cone, focusing optics direct a stream of ions (i.e., an "ion beam") 116 toward the third stage orifice 118, which links the second and third vacuum stages. The third vacuum stage (the stage shown in FIG. 1) is the mass-analysis stage, and a working pressure around 0.5 µTorr is standard.

In the illustrative embodiment, the ion source supplying the ion beam 116 to the instrument 100 is a direct-current (DC) glow discharge source. The DC glow discharge is achieved by fixing a brass, water-cooled energizer block against a metallic sample. A negative voltage of typically around 900 V, with a current-controlled output typically around 10 mA, is applied via the brass energizer block, causing the metallic sample to act as the cathode for the DC glow discharge. The cathodic sample is pressed against the first vacuum stage sampler plate, and a controlled stream of argon gas is bled into the first stage with a needle valve. A pressure of around 0.7 Torr is common in the first stage for operating the DC glow discharge. The described DC glow discharge source may commonly achieve ion currents on the order of 10 nA.

Following generation and transmission though the ion source interface into the mass-analysis stage of the instrument 100, the ion beam 116 is focused using ion optics 102. As shown in FIG. 1, the ion optics 102 are illustratively embodied as an electrostatic quadrupole doublet. This doublet consists of four circular ring electrodes, two sets of DC-quadruples, and a slit electrode for shaping and focusing the ion beam 116 prior to reaching the orthogonal extraction region 104.

After being focused by the ion optics 102, the ion beam 116 continuously passes through the orthogonal extraction region 104 of the instrument 100. The extraction region 104 is defined by a stainless steel repeller plate 120 in parallel with a second stainless steel plate having a grid to minimize penetration of the acceleration field into the field-free flight region 106. The gridded plate of the extraction region 104 is typically grounded because the field-free region 106 is held at ground potential; however, this plate may be isolated to allow the ability to float the field-free region 106. The two plates are arranged parallel to the incoming ion beam so that a positive potential applied to the repeller plate 120 accelerates ions within the orthogonal extraction region 104 in a direction normal to their initial kinetic energy (i.e., toward the field-free region 106). In the illustrative embodiment, constant momentum (rather than constant energy) is imparted to ions in the extraction region 104 by applying an extraction pulse with a width shorter than the shortest residence time of ions of interest in the extraction region 104. The initial ion beam 116 may approach the extraction region 104 closer to the repeller plate 120 than the gridded plate in order to create longer residence times. Typical acceleration potentials for CMA may be around 400 V, with a peak width of around 1 µs, but other extraction pulses are contemplated.

Figure 2:
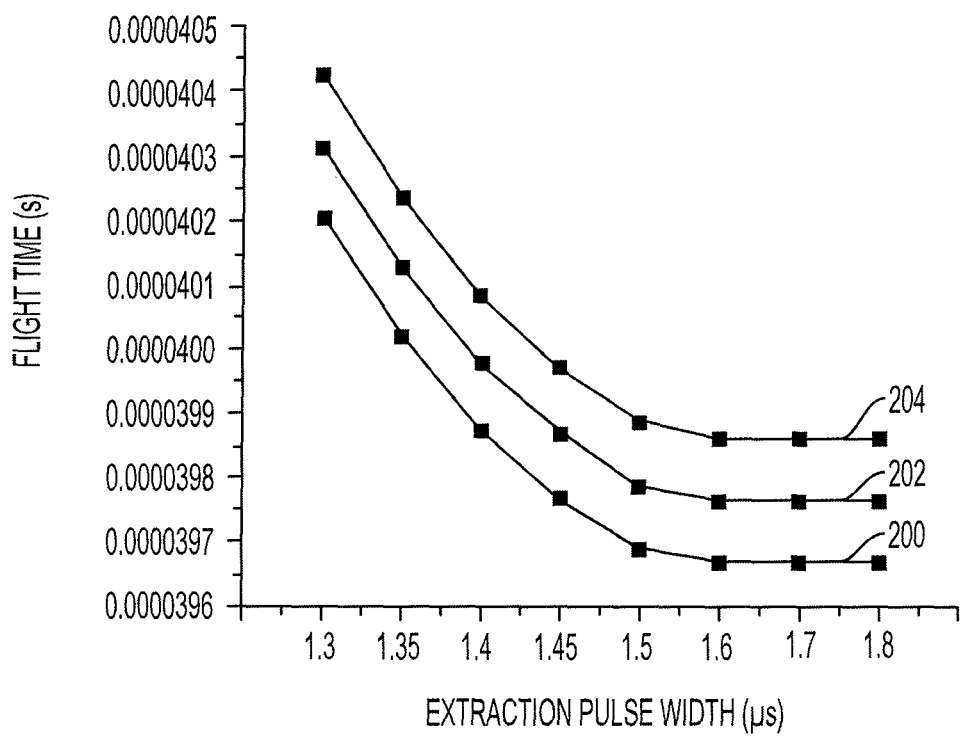
FIG. 2 is a graph of flight times for several exemplary isotopes as a function of the extraction pulse width employed.

FIG. 2 demonstrates how CMA, rather than constant energy acceleration, can be achieved or confirmed experimentally. In the illustrative embodiment, the instrument 100 was used to test the flight times of various lead isotopes: $^{206}$Pb (line 200), $^{207}$Pb (line 202), and $^{208}$Pb (line 204). The graph of FIG. 2 illustrates the flight times of the lead isotopes 200-204 as a function of the extraction pulse width applied to the repeller plate 120 of the extraction region 104 (with a pulse height of 656 V). Where CMA is achieved the flight times of each ion 200-204 will decrease with increased pulse width, as the extracted ions will have greater energy. FIG. 2 demonstrates that CMA occurs for the tested lead isotopes if an extraction pulse width of less than 1.6 µs is employed.

Referring again to FIG. 1, a linear-field reflectron (or "ion mirror") 108 follows the field-free region 106 of the instrument 100. The reflectron 108 redirects the ion beam 116 through the second orthogonal extraction region 110 and toward the TOFMS detector 112. As explained in detail in U.S. Pat. Publ. No. 2008/0017792, the use of the linear-field reflectron 108 allows for an "energy focus time" at which ions of the same m/z ratio, but different initial kinetic energies along the direction of constant momentum extraction, are all energy-focused. This "energy focus time" is beneficial for DOFMS because it allows ions to be in focus at a certain, known time. Specifically, all masses will reach a first-order energy focus according to, $$\Delta t_{det(eff)} = \frac{4\tau E_p}{E_M}, \quad (1)$$

where $\Delta t_{det}$ is the distance-of-flight extraction pulse delay, $\tau$ is the pulse width of constant momentum extraction, $E_p$ is the field strength of the constant momentum extraction, and $E_M$ is the field strength of the reflectron 108.

The instrument 100 performs DOFMS by detecting a packet of ions, separated by differing velocities, in the second orthogonal extraction region 110 at a specific time. A second repeller plate, positioned in the second orthogonal extraction region 110 below the path of the ion beam 116 after energy focusing in the reflectron 108, is used to pulse the ions upward in a direction nonparallel to the ion beam 116 in the field-free region 106 (i.e., toward the DOFMS detector 114). The delay time between constant momentum extraction in the first orthogonal extraction region 104 and distance-of-flight extraction in the second orthogonal extraction region 110 (assuming a constant set of other conditions) determines what ions will be in the second extraction region 110 at the moment the distance-of-flight extraction event occurs. In the illustrative embodiment, the ions in the second extraction region 110 at the moment of the extraction pulse are accelerated normal to the ion beam 116 and detected with a spatially selective ion detector 114.

Figure 3A:
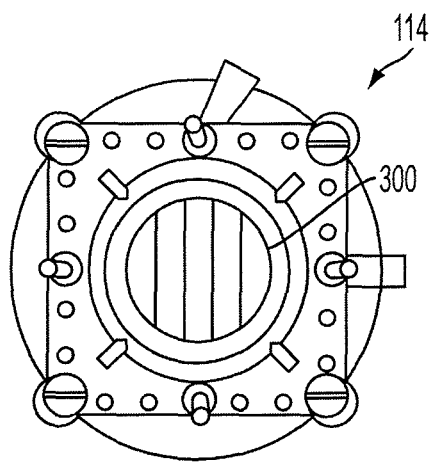
FIG. 3A shows an illustrative DOFMS detector which may be used in the instrument of FIG. 1.
Figure 3B:
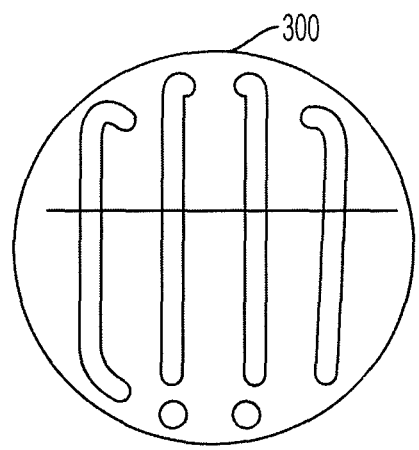
FIG. 3B shows an exemplary distance-of-flight detection pattern on a screen of the DOFMS detector of FIG. 3A.
Figure 3C:
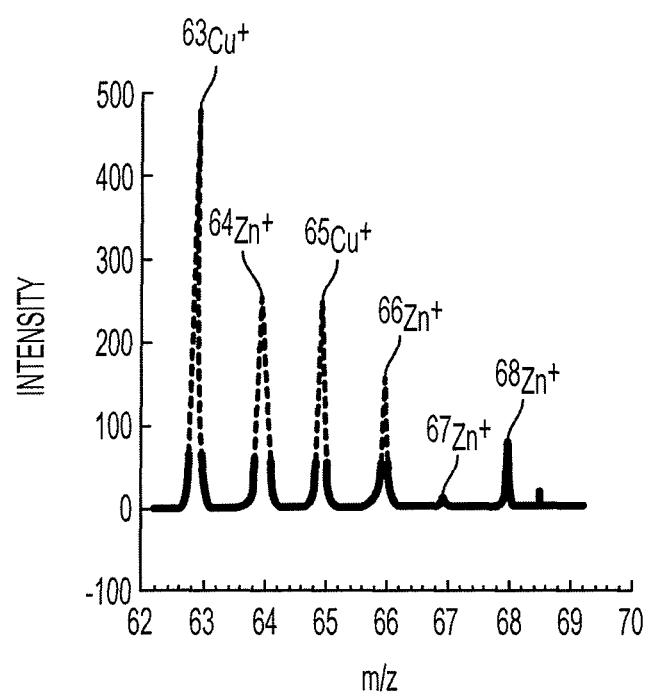
FIG. 3C is a graph illustrating a distance-of-flight mass spectrum obtained from analysis of the detection pattern of FIG. 3B.

In the illustrative embodiment of instrument 100, the DOFMS detector 114 is a microchannel plate (MCP) detector, in a chevron configuration, coupled to a phosphor screen. FIG. 3A illustrates the MCP-Phosphor detector 114 showing a two-dimensional isotopic pattern 300 of copper and zinc ions generated during a glow-discharge DOFMS analysis of a brass sample. The parameters used when performing this glow-discharge DOFMS included a constant momentum extraction pulse with a 468 V height and a 1 µs pulse width, a reflectron voltage of 355 V, and a distance-of-flight extraction pulse with a 1000 V height, a 2 µs pulse width, and a 19.4 µs delay time. The obtained isotopic pattern 300 (which can be seen in greater detail in FIG. 3B) demonstrates the distance-of-flight detection of $^{63}$Cu, $^{64}$Zn, $^{65}$Cu, and $^{66}$Zn, from left to right. The widths of the line spectra are 1.51 mm for $^{63}$Cu, 1.31 mm for $^{64}$Zn, 1.29 mm for $^{65}$Cu, and 1.22 mm for $^{66}$Zn. A graph of the relative intensities of these Cu and Zn isotopes sensed by the detector 114 is shown in FIG. 3C (in the same left to right order, with additional peaks for $^{67}$Zn and $^{68}$Zn).

In other embodiments, the DOFMS detector 114 of the instrument 100 may be an array of Faraday strips. Illustrative examples of such detector arrays are disclosed in U.S. Pat. No. 7,498,585, the entire disclosure of which is expressly incorporated by reference herein. As explained therein, these detectors employ an array of small metal strips (known as Faraday strips) to collect the charge transferred when each ion strikes the conductor. This charge is then integrated and amplified, providing a direct measurement of the flux of fundamental charges at each point. Developments in semiconductor construction technologies now allow such detectors arrays to be constructed monolithically on a single silicon chip. In such advanced detectors, the gain of each Faraday strip can be modified individually as desired. Also, each individual element can be accessed and measured non-destructively over any integration time required to provide a wide dynamic range. The use of such an array as the DOFMS detector 114 greatly increases the detectable dynamic range for any given sample (significantly, the low electronic noise and simultaneous detection inherent to DOFMS make it well suited for isotope measurements).

Figure 4:
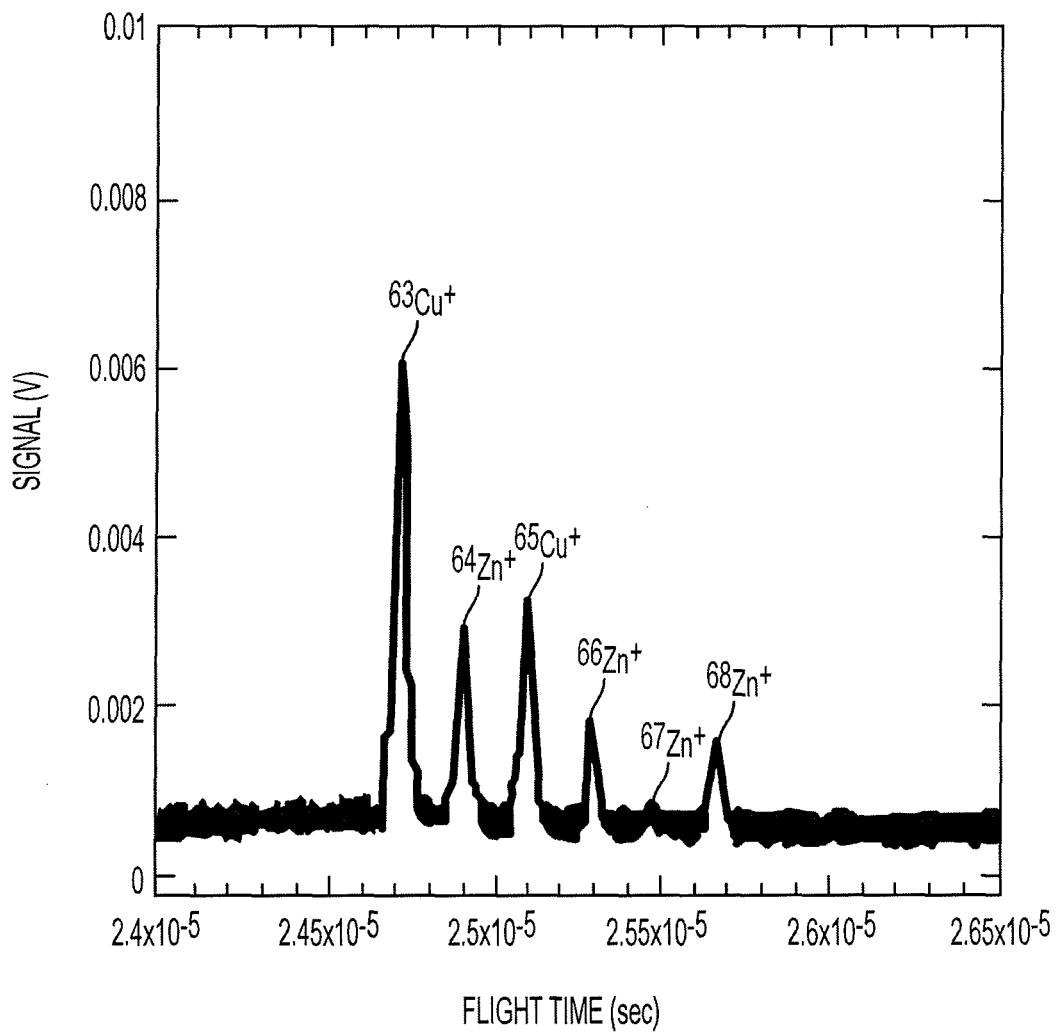
FIG. 4 is a graph illustrating a time-of-flight mass spectrum obtained using the instrument of FIG. 1.

In addition to the DOFMS detector 114, the instrument 100 also includes a TOFMS detector 112, which may be illustratively embodied as a discrete dynode electron multiplier (EM). This TOFMS detector 112 is positioned following the second orthogonal extraction region 110 along the flight path of the ion beam 116. Thus, ions which are not deflected to the DOFMS detector 114 pass through the extraction region 110 and are instead analyzed according to time-of-flight. By separating ions linearly with time (rather than quadratically, as in constant energy TOFMS), constant momentum TOFMS is able to produce high resolving powers for relatively short flight distances. FIG. 4 shows a constant momentum time-of-flight spectrum of a mass range including the same isotopes of copper and zinc shown in FIG. 3C.

Referring back to the "energy focus time" created by the linear-field reflectron 108 (discussed above with regard to DOFMS), in constant momentum TOFMS, this effect causes only a limited mass range to be focused on the TOFMS detector 112 at any given time. However, the resolving power of the limited mass range that does strike the TOFMS detector 112 with first-order energy focus is limited only by the initial spatial spread of the ion beam 116 in the first orthogonal extraction region 104. Even though only one "energy focus time" exists for CMA with a linear-field reflectron 108, a broad range of masses can be analyzed by TOFMS.

While both DOFMS and TOFMS are powerful analytical techniques individually, several advantages may accrue by using these MS methods in tandem. The spatially selective detectors used in typical DOFMS instruments are likely to have limited physical dimensions. For instance, the length of the active region of the DOFMS detector employed may limit the mass range available for DOFMS detection. In turn, this means that only a portion of the total mass spectrum (an m/z window) can be observed at any time, fundamentally limiting the mass coverage of the instrument. In the instrument 100, however, TOFMS detection in combination with DOFMS detection will "catch" all the ions not within the DOFMS mass window. The ability to detect all ions can be important when investigating complex mixtures of unknown composition.

Furthermore, the instrument 100 can easily be switched between constant momentum and constant energy acceleration, when desired (e.g., by applying a constant extraction pulse that persists until all ions have left the first orthogonal extraction region 104). By switching to a constant energy mode, the TOFMS channel can be operated like a conventional TOFMS and a space focus at the detector can be achieved. This flexibility allows the instrument 100 to first scan a complete mass spectrum with the TOFMS detector 112, after which a region of interest can be selected and analyzed using the DOFMS detector 114.

This acquisition of the TOFMS spectrum permits the DOFMS experiment to be accomplished much more efficiently. In the simplest example, the TOFMS mode can be employed to observe the entire m/z range in a single mass spectrum lasting 10-100 μsec (depending on instrument conditions and the desired mass range). This information can then be used to configure the DOFMS mode of operation for best efficiency. Those segments of the mass spectrum that contain no ions need not be investigated in DOFMS mode, for example. Information about the relative abundance of the ions at particular m/z values in the mass spectrum can also be used to program the DOFMS detector so that the optimal gain is employed for the ion flux that is expected at each particular m/z. The DOFMS experiments can then be carried out under the best experimental settings. The interdigitation of mass spectra can be accomplished in a wide variety of conditions that are reflective of the composition of the incoming ion beam 116.

Furthermore, the switch between constant energy TOFMS and constant momentum DOFMS/TOFMS is achievable within a typical single chromatographic peak. Because the fields can be manipulated very rapidly, the switch from TOFMS to DOFMS and back again can occur without negatively impacting either mode of operation. In addition, on this time scale, it is contemplated that the TOFMS-selection/DOFMS-analysis protocol set forth above could be computer-automated and ideal for examining complex mixtures on-line.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. By way of example, although the DOFMS/TOFMS instrument 100 has been described and illustrated herein as a co-linear device (i.e., a device in which ions travel in the same direction to either or both detectors), an anti-linear configuration, wherein DOFMS ions are extracted and sent in one direction, while TOFMS ions are extracted and sent in the opposite direction, is also possible. In such embodiments, these opposing directions may be at 180 degrees, 90 degrees, or any other angle.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present invention and fall within the spirit and scope of the present disclosure as defined by the appended claims.

The invention claimed is:

1. A mass spectrometry instrument comprising:
   an ion source configured to produce ions having varying mass-to-charge ratios;
   a first detector configured to determine when each of the ions travels a predetermined distance;
   a second detector configured to determine how far each of the ions travels in a predetermined time; and
   a detector extraction region operable to direct portions of the ions either to the first detector or to the second detector.

2. The mass spectrometry instrument of claim 1, wherein the detector extraction region is operable to direct a first portion of the ions to the first detector and to direct a second portion of the ions to the second detector.

3. The mass spectrometry instrument of claim 1, wherein the detector extraction region directs ions toward the second detector when activated and directs ions toward the first detector when deactivated.

4. The mass spectrometry instrument of claim 1, wherein the detector extraction region directs ions toward the first detector when activated and directs ions toward the second detector when deactivated.

5. The mass spectrometry instrument of claim 3, wherein the detector extraction region comprises an electrostatic field when activated.

6. The mass spectrometry instrument of claim 5, wherein the ions have a first direction of travel when entering the detector extraction region and the electrostatic field deflects the ions in a second direction, the second direction being nonparallel to the first direction.

7. The mass spectrometry instrument of claim 6, wherein the detector extraction region comprises a repeller plate which generates the electrostatic field when supplied with a voltage.

8. The mass spectrometry instrument of claim 1, further comprising a source extraction region which applies an acceleration pulse to the ions produced by the ion source.

9. The mass spectrometry instrument of claim 8, wherein the acceleration pulse imparts mass-to-charge ratio dependent velocities on the ions.

10. The mass spectrometry instrument of claim 9, wherein the acceleration pulse has a longer period than the time it takes for all of the ions to exit the source extraction region.

11. The mass spectrometry instrument of claim 9, wherein the acceleration pulse has a shorter period than the time it takes for any of the ions to exit the source extraction region.

12. The mass spectrometry instrument of claim 11, further comprising a reflectron configured to provide energy focus to a portion of the ions with a range of initial energies.

13. A method comprising:
generating an ion beam having ions of varying mass-to-charge ratios;
transmitting the ion beam into a detector extraction region; and
directing portions of the ion beam toward one of a first detector configured to determine when each of the ions travels a predetermined distance and a second detector configured to determine how far each of the ions travels in a predetermined time.

14. The method of claim 13, wherein directing portions of the ion beam toward one of the first detector and the second detector comprises:
directing a first portion of the ion beam to the first detector; and
directing a second portion of the ion beam to the second detector.

15. The method of claim 13, wherein directing portions of the ion beam toward one of the first detector and the second detector comprises activating and deactivating the detector extraction region.

16. The method of claim 15, wherein activating and deactivating the detector extraction region comprises selectively generating an electrostatic field.

17. The method of claim 13, wherein directing portions of the ion beam toward the first detector comprises allowing portions of the ion beam to pass through the detector extraction region without disturbing a prior trajectory of the ion beam.

18. The method of claim 17, wherein directing portions of the ion beam toward the second detector comprises deflecting portions of the ion beam from the prior trajectory.

19. The method of claim 13, wherein directing portions of the ion beam toward the second detector comprises allowing portions of the ion beam to pass through the detector extraction region without disturbing a prior trajectory of the ion beam.

20. The method of claim 19, wherein directing portions of the ion beam toward the first detector comprises deflecting portions of the ion beam from the prior trajectory.

21. The method of claim 13, further comprising applying an acceleration pulse to the ion beam to impart mass-to-charge ratio dependent velocities on the ions.

22. The method of claim 21, further comprising transmitting the ion beam through a reflectron configured to provide energy focus to a portion of the ions with a range of initial energies.

23. The method of claim 13, further comprising:
receiving data from the first detector regarding the mass-to-charge ratios of the ions; and
determining which portions of the ion beam to direct toward the second detector in response to the data.

24. The mass spectrometry instrument of claim 1, wherein the second detector comprises a linear array of discrete charge-collecting Faraday strips for collecting the portions of the ions directed to the second detector.

25. The mass spectrometry instrument of claim 24, wherein the second detector further comprises a first amplifier associated with each of the Faraday strips, each first amplifier having a capacitance in circuit with the first amplifier to form an integrator.

26. The mass spectrometry instrument of claim 25, wherein the second detector further comprises:
a second amplifier associated with each of the integrators; and
a computing device configured to control the second amplifiers to sample charges resulting from impingement of ions onto the Faraday strips and to hold the charges resulting from the impingement of ions onto the Faraday strips for a time.

27. The mass spectrometry instrument of claim 1, wherein the second detector comprises a focal plane camera, an active area of the focal plane camera extending along a mass-separation axis of the detector extraction region, a focal plane of the focal plane camera being positioned at a space-focus plane of the mass spectrometry instrument during distance-of-flight mass spectrometry.

28. The mass spectrometry instrument of claim 27, wherein the second detector further comprises a structure providing an extraction orifice positioned between the detector extraction region and the focal plane of the focal plane camera, the structure providing the extraction orifice being maintained at about ground potential.

29. The mass spectrometry instrument of claim 27, further comprising a chiller mounted in a heat conducting relationship with the focal plane camera.

30. The mass spectrometry instrument of claim 29, further comprising a fluid circuit coupled to the chiller and to a source of refrigerant, the fluid circuit configured to carry heat away from the chiller.

* * * * *